US008656885B2

(12) United States Patent
Negoro et al.

(10) Patent No.: US 8,656,885 B2
(45) Date of Patent: Feb. 25, 2014

(54) ENGINE FOR A VEHICLE

(75) Inventors: Masaaki Negoro, Wako (JP); Tsuyoshi Arima, Wako (JP); Takanori Osuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 275 days.

(21) Appl. No.: 13/038,590

(22) Filed: Mar. 2, 2011

(65) Prior Publication Data

US 2011/0315110 A1 Dec. 29, 2011

(30) Foreign Application Priority Data

Mar. 4, 2010 (JP) ................................ 2010-047465

(51) Int. Cl.
*F02F 7/00* (2006.01)
*F16N 31/00* (2006.01)

(52) U.S. Cl.
USPC ............... 123/195 C; 123/195 R; 123/196 R; 184/106

(58) Field of Classification Search
USPC ........................... 123/196 R, 195 R; 184/106
See application file for complete search history.

(56) References Cited

U.S. PATENT DOCUMENTS

| | | | | |
|---|---|---|---|---|
| 1,876,708 A * | 9/1932 | MacPherson | ................ | 184/6.22 |
| 6,237,720 B1 * | 5/2001 | Sutton | ........................... | 184/106 |
| 6,725,974 B2 * | 4/2004 | Sato et al. | ..................... | 184/106 |
| 7,341,039 B1 * | 3/2008 | Jaszewski et al. | ........ | 123/196 R |
| 7,617,810 B1 * | 11/2009 | Phillips et al. | ............. | 123/192.2 |
| 8,281,758 B2 * | 10/2012 | Kurihara et al. | ........... | 123/90.33 |
| 8,302,577 B2 * | 11/2012 | Wunsch et al. | ........... | 123/196 R |
| 2005/0252480 A1 * | 11/2005 | Stadtaus | ................... | 123/196 R |
| 2010/0132655 A1 * | 6/2010 | Wunsch et al. | ........... | 123/196 R |
| 2011/0315110 A1 * | 12/2011 | Negoro et al. | ............. | 123/192.2 |

FOREIGN PATENT DOCUMENTS

| | | |
|---|---|---|
| JP | 2006-257877 | 9/2006 |
| JP | 2011174423 A * | 9/2011 |

* cited by examiner

*Primary Examiner* — Thanh Truong
*Assistant Examiner* — Tea Holbrook
(74) *Attorney, Agent, or Firm* — Squire Sanders (US) LLP

(57) ABSTRACT

An engine for a vehicle can include an oil pan coupled to a lower portion of a crankcase, and a partition wall configured to partition a crank chamber in the crankcase and the oil pan. The partition wall can be disposed on the crankcase, and can include openings configured to return oil from a crank chamber side to an oil pan side. Bridges are configured to suppress back flow of the oil from the oil pan side to the crank chamber side. The bridges can be fixedly disposed below the openings so as to cover at least part of the openings from below.

20 Claims, 10 Drawing Sheets

ENGINE FOR A VEHICLE

BACKGROUND

1. Field

This invention relates to an engine for a vehicle wherein an oil pan is coupled to a lower portion of a crankcase and a partition wall for partitioning a crank chamber in the crankcase and the inside of the oil pan from each other is provided in the crankcase while an opening for returning oil from the crank chamber side to the oil pan side is provided in the partition wall.

2. Description of the Related Art

An engine for a vehicle wherein a partition wall positioned above an oil reservoir formed in an oil pan is provided in a crankcase in such a manner that it partitions a crank chamber in the crankcase and the oil reservoir from each other and an oil dropping hole for allowing oil to drop from the crank chamber into the oil reservoir is provided at a lower portion of an inclined portion provided at a portion of the partition wall is known from Patent Document 1.

SUMMARY OF THE INVENTION

Problem to be Solved by the Invention

However, in the engine for a vehicle disclosed in Patent Document 1 (Japanese Patent Laid-Open No. 2006-257877), although it is possible to return oil from the crankcase to the oil pan side, when the oil surface in the oil reservoir oscillates upon turning, acceleration and braking of the vehicle, oil sometimes flows back through the oil dropping hole to the crank chamber side. There is the possibility that this may cause aeration in that air is mixed into the oil or the oil may disperse to deteriorate the recovering property thereof.

The present invention has been made in view of such a situation as described above, and it is an object of the present invention to provide an engine for a vehicle which makes it possible to return oil smoothly from within a crankcase into an oil pan, and to makes it possible to prevent deterioration of the recovering property by aeration or oil dispersion caused by jumping or splashing of oil from the oil pan.

SUMMARY

In order to attain the object described above, according to the present invention, an engine for a vehicle is provided wherein an oil pan is coupled to a lower portion of a crankcase, and a partition wall for partitioning a crank chamber in the crankcase and the inside of the oil pan is provided on the crankcase. Openings for returning oil from the crank chamber side to the oil pan side are provided in the partition wall. The engine can have a first characteristic in that bridges for suppressing backflow of the oil from the oil pan side to the crank chamber side are fixedly disposed below the openings in such a manner as to cover at least part of the openings from below.

According to an embodiment of the present invention, the engine for a vehicle has, in addition to the configuration of the first characteristic, a second characteristic in that the bridges are provided integrally with the partition wall.

According to an embodiment of the present invention, the engine for a vehicle can have, in addition to the configuration of the second characteristic, a third characteristic in that at least part of the partition wall is formed flat as a horizontal wall portion, and the bridges extend from the horizontal wall portion in such a manner as to be inclined downwardly from the horizontal wall portion.

According to an embodiment of the present invention, the engine for a vehicle can have, in addition to the configuration of the third characteristic, a fourth characteristic in that the bridges are formed in such a manner as to project in at least one of forward and backward directions from the horizontal wall portion when the engine is mounted on the vehicle.

The engine for a vehicle can also have, in addition to the configuration of the third or fourth characteristic, a fifth characteristic in that the length of the bridges in the forward and backward direction when the engine is mounted on the vehicle is set to be smaller than the length of the openings in the forward and backward direction.

The engine for a vehicle can also have, in addition to the configuration of any of the second to fifth characteristics, a sixth characteristic in that the openings are provided in the partition wall in such a manner as to be paired in the forward and backward direction in the state in which the engine is mounted on the vehicle, and the bridges corresponding to the front side openings extend forwardly from the partition wall while the bridges corresponding to the rear side openings extend rearwardly from the partition wall.

The engine for a vehicle can also have, in addition to the configuration of any of the second to fifth characteristics, a seventh characteristic in that the bridge extending rearwardly from the partition wall in the state in which the engine is mounted on the vehicle is disposed below the opening in such a manner as to cover at least part of the opening. An inclined wall portion inclined rearwardly downwards forwardly of the bridge is provided at part of the partition wall. An oil returning hole for returning the oil from the crank chamber side to the oil pan side is provided at a lowermost portion of a rear end of the inclined wall portion.

The engine for a vehicle can also have, in addition to the configuration of any one of the first to seventh characteristics, an eighth characteristic in that a crankshaft having an axial line extending along a vehicle widthwise direction in the state in which the engine is mounted on the vehicle is supported for rotation on the crankcase above the partition wall. The openings are disposed at least on one of the front and rear sides of a virtual vertical line which passes the axial line of the crankshaft.

The engine for a vehicle has, in addition to the configuration of the eighth characteristic, a ninth characteristic in that a balancer disposed obliquely forwardly downwards of the crankshaft is supported for rotation by the crankcase, and the openings disposed below the balancer are provided in the partition wall while the bridges are disposed below the openings.

Further, the engine for a vehicle can also have, in addition to any one of the configurations of the first to sixth, eighth and ninth characteristics, a tenth characteristic in that the crankcase includes an upper case half and a lower case half coupled to each other for upward and downward division, the plural sets of openings paired in the forward and backward direction in the state in which the engine is mounted on the vehicle are provided in a spaced relationship from each other in the vehicle widthwise direction in the partition wall, and an oil path disposed between the openings on the front side and the openings on the rear side and extending in the vehicle widthwise direction is provided in the partition wall. The upper case half and the lower case half can be coupled to each other by a plurality of bolts including bolts disposed at least at two locations between which the oil path is sandwiched from the front side and the rear side between the plural openings juxtaposed in the vehicle widthwise direction.

It is to be noted that a second balancer 93 in the embodiments corresponds to the balancer in the present invention.

According to the first characteristic of the present invention, the bridges which cover at least part of the openings provided in the partition wall which partitions the crank chamber and the oil pan from each other from below are fixedly disposed below the openings, and backflow of the oil from the oil pan side to the crank chamber side is suppressed by the bridges. Consequently, the oil can be returned smoothly from within the crankcase into the oil pan, and even where the oil surface in the oil pan is oscillated by oscillation of the engine, the oil is suppressed from flowing back from the oil pan side to the crank chamber side by jumping of the oil from the oil pan. Therefore, deterioration of the recovering property by aeration or oil dispersion can be prevented.

Further, according to the second characteristic of the present invention, since the bridges are provided integrally with the partition wall, in comparison with an alternative case wherein the bridges are formed as separate members from the partition wall, reduction of the number of parts becomes possible and the necessity for the attaching work of the bridges is eliminated. Consequently, reduction of man-hours required for manufacturing can be anticipated.

According to the third characteristic of the present invention, since the bridges extend from the flat horizontal wall portion formed on the partition wall in such a manner as to be inclined downwardly from the horizontal wall portion. Consequently, the oil can be returned smoothly from the crank chamber side to the oil pan side, and jumping of the oil from the oil pan can be suppressed by the inclined bridges.

According to the fourth characteristic of the present invention, since the bridges project in at least one of forward and backward directions from the horizontal wall portion, the bridges can be disposed so as to cope with oscillation of the oil-surface in the oil reservoir in the forward and backward directions upon starting, upon stopping and so forth of the vehicle.

According to the fifth characteristic of the present invention, since the length of the bridges in the forward and backward direction is set smaller than the length of the openings in the forward and backward direction, it is possible to prevent the length of the bridges in the forward and backward direction from becoming longer than necessary by the inclination of the bridges.

According to the sixth characteristic of the present invention, the openings are provided in the partition wall in such a manner as to be paired in the forward and backward direction and the bridges corresponding to the front side openings extend forwardly from the partition wall while the bridges corresponding to the rear side openings extend rearwardly from the partition wall. Therefore, the oil recovering property into the oil pan is enhanced by the plural openings and forward and backward oscillation of the oil surface in the oil reservoir can be suppressed by the front and rear inclined bridges.

According to the seventh characteristic of the present invention, the bridge extending rearwardly from the partition wall is disposed below the opening, and the oil returning hole is provided at the lowermost portion of the rear end of the inclined wall portion provided in the partition wall in the rearwardly downwardly inclined relationship forwardly of the bridge. Therefore, returning of the oil to the crank chamber side by forward oscillation of the oil surface in the oil pan is stopped by the inclined wall portion, and returning of the oil to the crank chamber side by rearward oscillation of the oil surface is stopped by the rearwardly inclined bridge. Consequently, backflow of the oil by jumping from the oil pan can be suppressed efficiently, and returning of the oil from the crank chamber to the oil pan can be assured by the opening while the oil which is guided by the upper face of the inclined wall portion is dropped from the oil returning hole into the oil pan. Consequently, in certain embodiments, a sufficient recovering property can be provided.

According to the eighth characteristic of the present invention, since the bridges can be disposed at least on one of the front and rear sides of the virtual vertical line which passes the axial line of the crankshaft having the axial line extending along the vehicle widthwise direction, the oil scattered from the crankshaft can be recovered smoothly into the oil pan.

According to the ninth characteristic of the present invention, since the openings are disposed below the balancer disposed obliquely forwardly downwards of the crankshaft, the oil scattered from the balancer can be recovered into the oil pan smoothly.

Further, according to the tenth characteristic of the present invention, the plural sets of openings paired in the forward and backward direction are provided in a spaced relationship from each other in the vehicle widthwise direction in the partition wall, and the oil path disposed between the openings on the front side and the rear side and extending in the vehicle widthwise direction is provided in the partition wall. Further, the upper case half and the lower case half which can be divided upwardly and downwardly from each other and cooperate with each other to configure the crankcase are coupled to each other by the plural bolts including the bolts disposed at least at the two locations between which the oil path is sandwiched from the front side and the rear side between the plural openings juxtaposed in the vehicle widthwise direction. Consequently, the oil path can be disposed in a high space efficiency in the dead space while preventing interference with the plural openings provided in the partition wall and the bolts for coupling the upper case half and the lower case half to each other. Consequently, an undesirable increase in size of the crankcase can be prevented.

DESCRIPTION OF EMBODIMENTS

Certain embodiments of the invention are described with reference to FIGS. 1 to 10 of the accompanying drawings.

Figure 1:
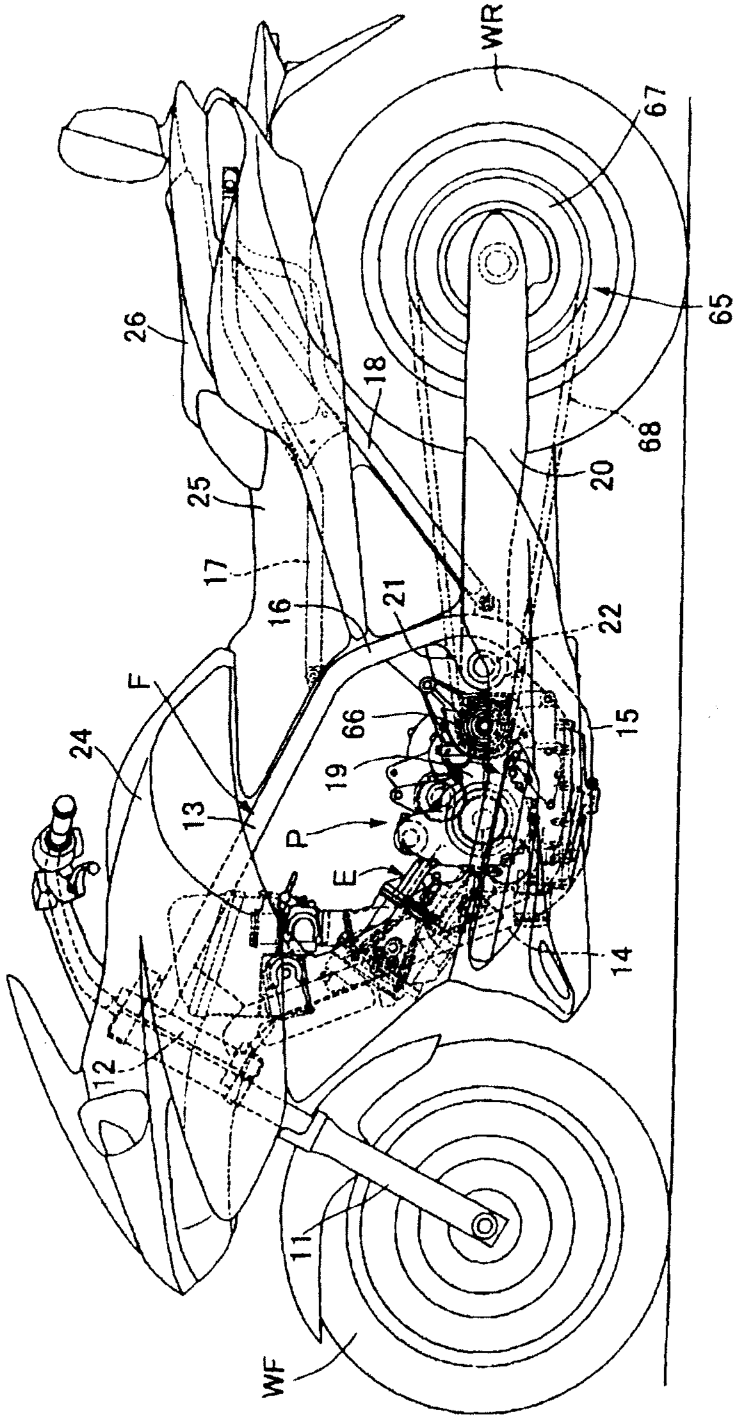
FIG. 1 is a side elevational view of a motorcycle of a working example 1.

A working example 1 of the present invention is described with reference to FIGS. 1 to 9. Referring first to FIG. 1, a vehicle body frame F of a motorcycle which is a vehicle includes a head pipe 12 for supporting a front fork 11, on which a front wheel WF is supported for rotation, for steering movement. A pair of left and right main frames 13 extend rearwardly downwards from the head pipe 12, a pair of left and right down frames 14 extend rearwardly downwards in a steeper gradient than the main frames 13, and lower frames 15 extend rearwardly from lower ends of the two down frames 14. A pair of left and right center frames 16 extending downwardly from rear ends of the main frames 13 and are connected to rear ends of the lower frames 15. A pair of left and right seat rails 17 extend rearwardly upwards from rear ends of the main frames 13, and rear frames 18 are provided for connecting lower portions of the center frames 16 and rear portions of the seat rails 17 to each other. The main frames 13, down frames 14, lower frames 15 and center frames 16 are formed continuously into integrated members by bending of pipes made of, for example, metal.

Within a region surrounded by the main frames 13, down frames 14, lower frames 15 and center frames 16, a power unit P which can include an engine E of a multi-cylinder type, for example, of a two-cylinder type, and a gear transmission M (refer to FIG. 3) which is partly built in a crankcase 19 of the engine E is disposed in such a manner as to be supported by the vehicle body frame F. Further, a swing arm 20 which supports a rear wheel WR, which is driven by power exerted by the power unit P, for rotation at a rear end portion thereof, is supported at a front end portion thereof for upward and downward rocking motion on pivot plates 21 provided at lower portions of the center frames 16 through a support shaft 22. Further, a fuel tank 24 can be carried on the main frames 13 above the engine E, and a riding front seat 25 disposed rearwardly of the fuel tank 24 and a riding rear seat 26 disposed further rearwardly of the riding front seat 25 are supported by the seat rails 17.

Figure 2:
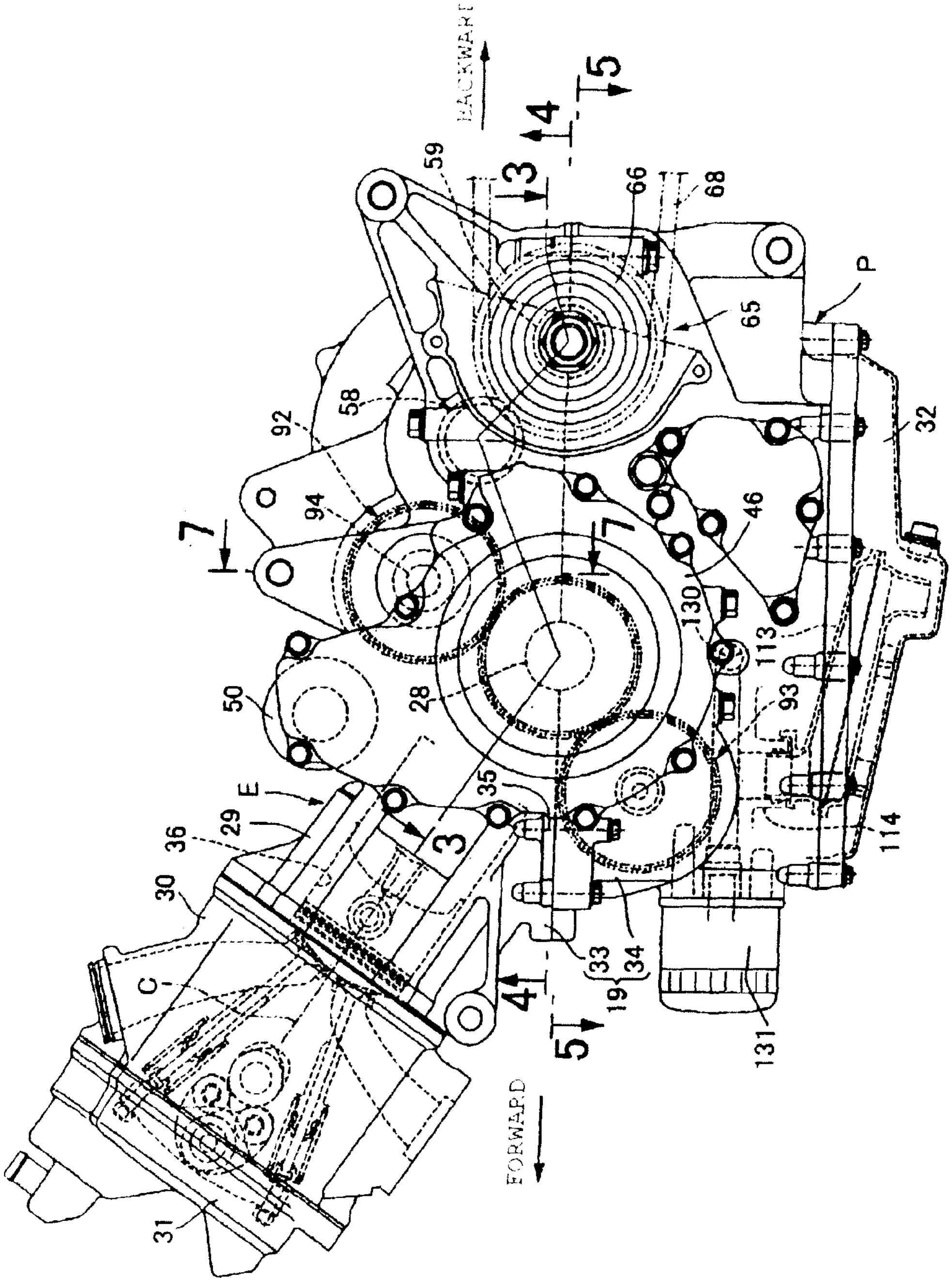
FIG. 2 is a side elevational view of a power unit as viewed in a direction same as in FIG. 1.

Referring to FIG. 2, the engine E can include a crankcase 19 for supporting a crankshaft 28, which has an axial line extending in a vehicle widthwise direction, for rotation thereon, a cylinder block 29 coupled to an upper end of a front portion of the crankcase 19 such that it has a cylinder axial line C inclined forwardly, a cylinder head 30 coupled to an upper end of the cylinder block 29, and a head cover 31 coupled to an upper end of the cylinder head 30. An oil pan 32 is coupled to a lower portion of the crankcase 19.

Referring to FIGS. 3 to 6, the crankcase 19 is formed such that an upper case half 33 and a lower case half 34 are coupled to each other along a parting face 35 so as to be divided upwardly and downwardly. The cylinder block 29 is formed integrally with the upper case half 33.

The cylinder block 29 has a plurality of cylinder bores. In this example, two cylinder bores 36, 36 are disposed in parallel to each other in the vehicle widthwise direction. A plurality of support walls having bearing holes 37 in which the crankshaft 28 is fitted and supported are provided in the crankcase 19 which supports the crankshaft 28, which extends in the arrangement direction of the cylinder bores 36, which is, in the vehicle widthwise direction, for rotation thereon. In particular, in the present embodiment, first, second and third support walls 38, 39 and 40 juxtaposed in order from one end (left end in FIG. 3) of the crankshaft 28 in its axial direction toward the other end (right end in FIG. 3) side in the axial direction are provided on the crankcase 19 such that they individually have bearing holes 37. Besides, between those support walls which are disposed adjacent each other in the direction along the axial line of the crankshaft 28 in the crankcase 19, in particular, between the first and second support walls 38 and 39 and between the second and third support walls 39 and 40, crank chambers 41, 41 individually corresponding to the plural cylinder bores 36 are formed. Further, at a rear portion in the crankcase 19, a transmission chamber 42 communicating commonly with the crank chambers 41 is formed.

The first to third support walls 38, 39 and 40 can be configured by cooperation between upper wall portions 38*a*, 39*a* and 40*a* provided integrally on the upper case half 33 and lower wall portions 38*b*, 39*b* and 40*b* provided integrally on the lower case half 34. The bearing holes 37 provided on the first to third support walls 38 to 40 are individually formed from semicircular recessed portions 43 formed at lower ends of the first, second and third upper wall portions 38*a*, 39*a* and 40*a* and open downwardly and semicircular recessed portions 44 formed at upper ends of the lower wall portions 38*b*, 39*b* and 40*b* and open upwardly.

Figure 3:
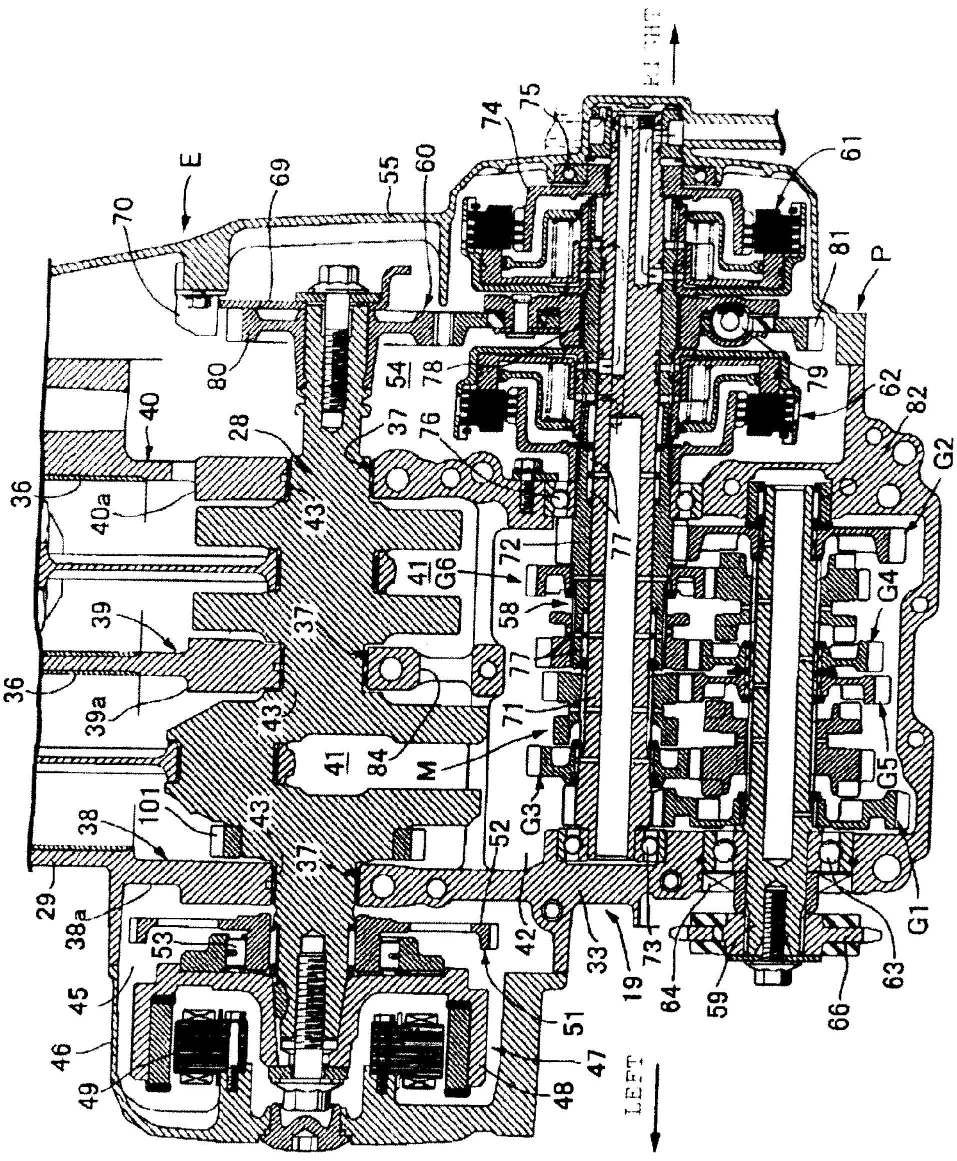
FIG. 3 is a sectional view taken along line 3-3 of FIG. 2.
Figure 4:
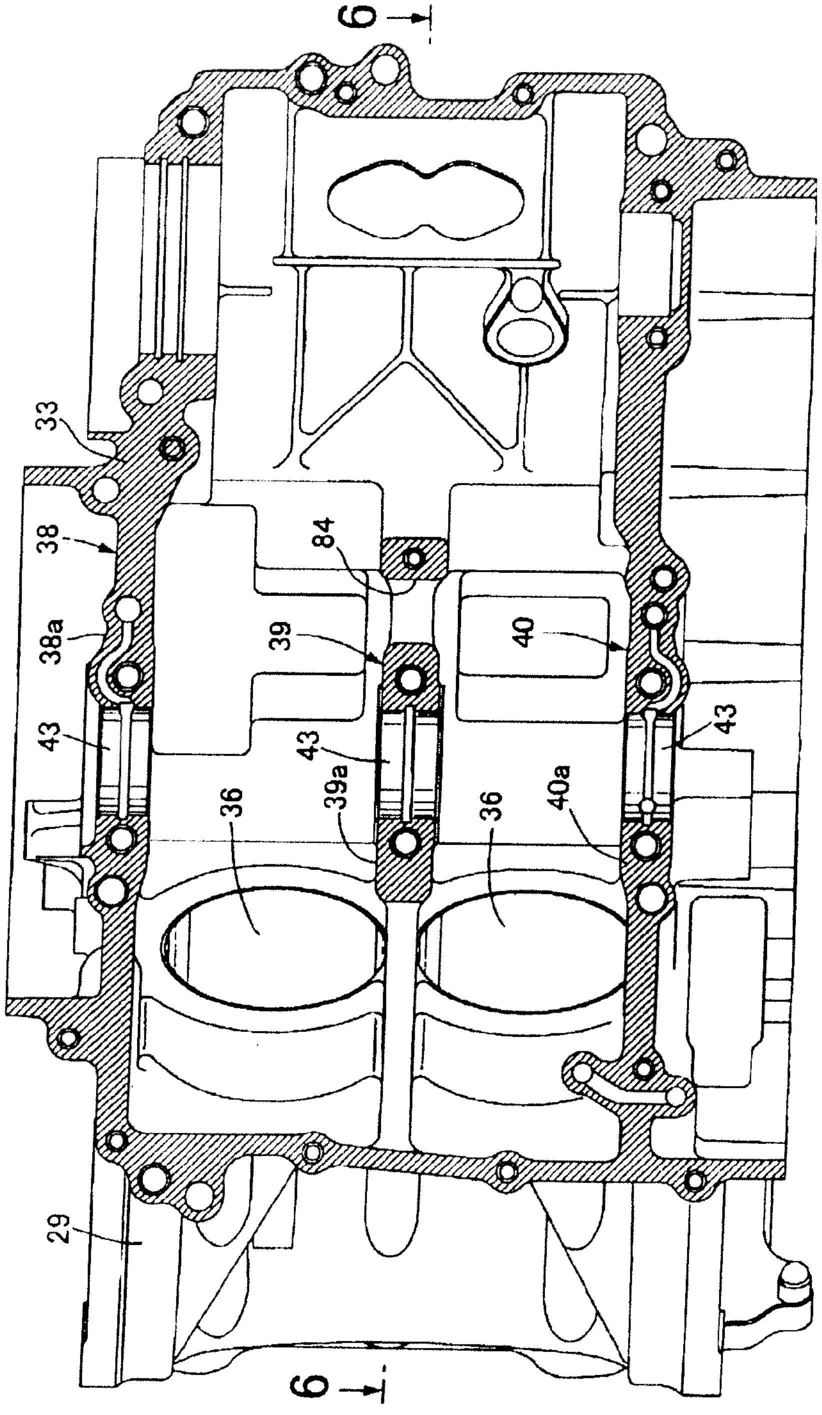
FIG. 4 is a sectional view taken along line 4-4 of FIG. 2.

Paying attention to FIG. 3, a left case cover 46 which cooperates with the crankcase 19 to form a generator chamber 45 therebetween is coupled to a left side face of the crankcase 19, and a rotor 48 of a generator 47 accommodated in the generator chamber 45 is secured to one end portion of the crankshaft 28. A stator 49 of the generator 47 is secured to the left case cover 46 such that it is surrounded by the rotor 48.

Above the crankcase 19, a starter motor 50 can be fixed and disposed in such a manner that it is covered from sidewardly with an upper end portion of the left case cover 46. A driven gear 52 which configures part of a reduction gear train 51 for transmitting power from the starter motor 50 is connected to the rotor 48 through a one-way clutch 53.

A right case cover 55 which cooperates with the crankcase 19 to form a clutch chamber 54 therebetween is coupled to a right side face of the crankcase 19. Thus, in the transmission chamber 42, the gear transmission M wherein a plurality of gear trains, for example, first to sixth speed gear trains G1 to G6, for a plurality of speeds which can be selectively established are provided between a main shaft 58 and a countershaft 59. The shafts are supported for rotation on the crankcase 19 such that they have axial lines parallel to the crankshaft 28. Further, in the clutch chamber 54, a primary speed reducer 60 is provided for transmitting power from the crankshaft 28, and first and secondary hydraulic clutches 61 and 62 interposed between the primary speed reducer 60 and the main shaft 58 are accommodated.

One end portion of the countershaft 59 projects from a left side face of a rear portion of the crankcase 19 such that a ball bearing 63 and an annular seal member 64 are interposed between the countershaft 59 and the crankcase 19. The countershaft 59 is supported at the other end portion thereof for rotation on a right side wall of the crankcase 19 through a roller bearing 82.

Rotational power outputted from the one end portion of the countershaft 59 is transmitted to the rear wheel WR through power transmission means 65 as seen in FIG. 1. The power transmission means 65 is configured such that an endless chain 68 extends between and around a driving sprocket wheel 66 secured to an end of the countershaft 59 and a driven sprocket wheel 67 provided coaxially with the rear wheel WR.

The crankshaft 28 has a pulser 69 secured to the other end thereof, and a rotational speed sensor 70 disposed in the clutch chamber 54 is secured to the right case cover 55 in an opposing relationship to an outer periphery of the pulser 69.

The main shaft 58 includes a first shaft 71 and a second shaft 72 in which the first shaft 71 is fitted coaxially for relative rotation, and the first speed gear train G1, third speed gear train G3 and fifth speed gear train G5 are provided between the first shaft 71 and the countershaft 59 while the second speed gear train G2, fourth speed gear train G4 and sixth speed gear train G6 are provided between the second shaft 72 and the countershaft 59.

In this example, the first shaft 71 can be formed with a diameter smaller than that of the second shaft 72 and is supported at one end portion thereof for rotation on the upper case half 33 of the crankcase 19 through a ball bearing 73. The first shaft 71 which extends for rotation through the crankcase 19 is supported at the other end portion thereof for rotation on the right case cover 55 through a clutch inner 74 and a ball bearing 75. Meanwhile, in the crankcase 19, the second shaft 72 having a greater diameter than the first shaft 71 is supported at an intermediate portion thereof in the axial direction for rotation through a ball bearing 76, and an intermediate portion of the first shaft 71 is fitted coaxially for relative rotation in the second shaft 72. A plurality of needle bearings 77, 77 are interposed between the first shaft 71 and the second shaft 72.

A cylindrical shaft 78 is mounted for relative rotation on the other end side of the first shaft 71 such that it is disposed adjacent to the second shaft 72 in the axial direction, and power from the crankshaft 28 is transmitted to the cylindrical shaft 78 through the primary speed reducer 60 and a damper spring 79. The primary speed reducer 60 includes a driving gear 80 which rotates together with the crankshaft 28, and a driven gear 81 disposed coaxially with the first and second shafts 71 and 72 for meshing with the driving gear 80. The driven gear 81 is connected to the cylindrical shaft 78 through the damper spring 79.

The first hydraulic clutch 61 can be provided between the cylindrical shaft 78 and the first shaft 71, and the clutch inner 74 which the first hydraulic clutch 61 includes is coupled against relative rotation to the other end portion of the first shaft 71. The ball bearing 75 is interposed between the clutch inner 74 and the right case cover 55. Further, between the cylindrical shaft 78 and the second shaft 72, the second hydraulic clutch 62 is provided which cooperates with the first hydraulic clutch 61 to sandwich the primary speed reducer 60 therebetween.

When the first hydraulic clutch 61 is in a power transmitting state in which power is transmitted from the crankshaft 28 to the first shaft 71, power can be transmitted from the first shaft 71 to the countershaft 59 through a gear train selectively established from among the first, third and fifth speed gear trains G1, G3 and G5. On the other hand, when the second hydraulic clutch 62 is in a power transmitting state in which power is transmitted from the crankshaft 28 to the second shaft 72, power can be transmitted from the second shaft 72 to the countershaft 59 through a gear train selectively established from among the second, fourth and sixth speed gear trains G2, G4 and G6.

Figure 5:
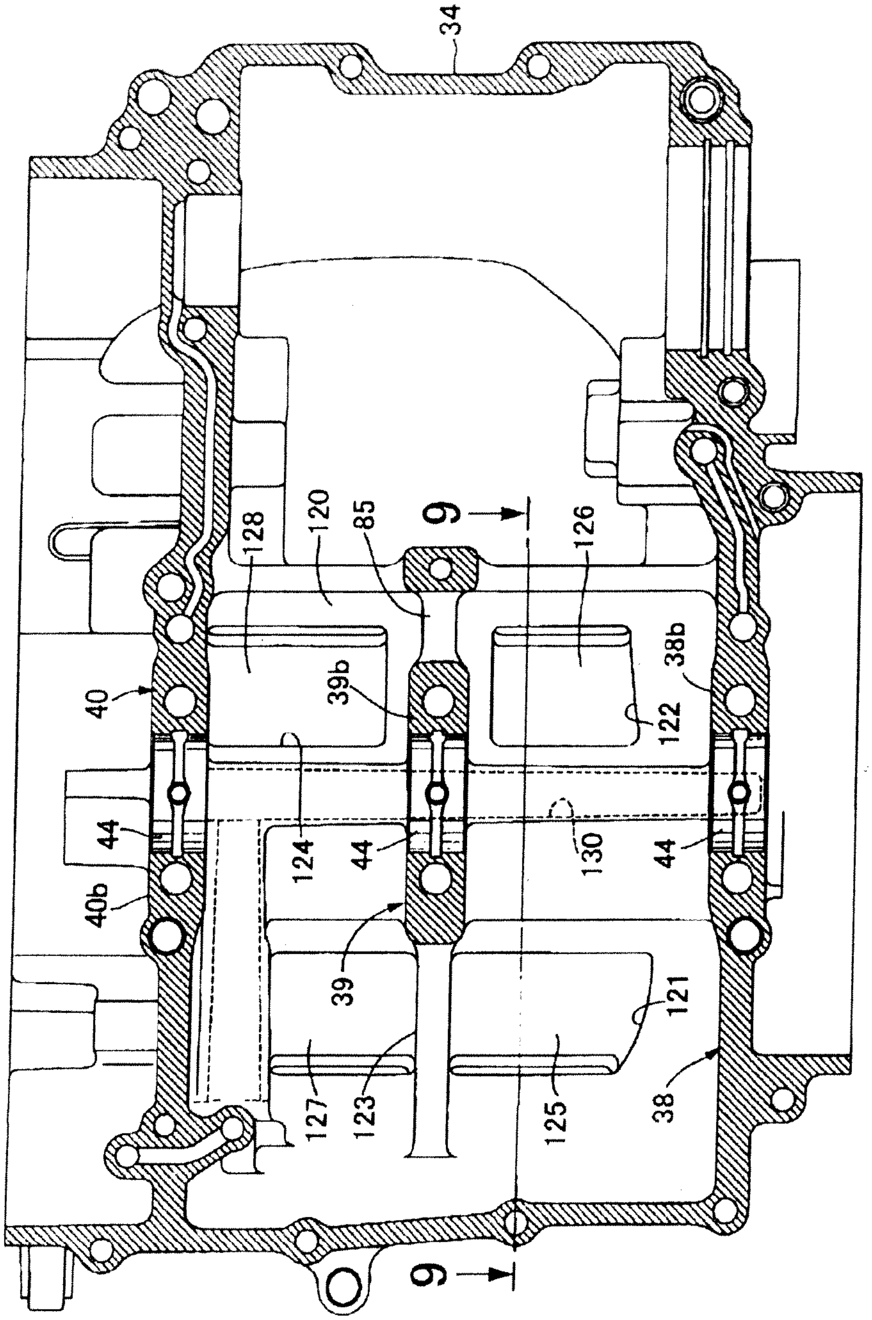
FIG. 5 is a sectional view taken along line 5-5 of FIG. 2.
Figure 6:
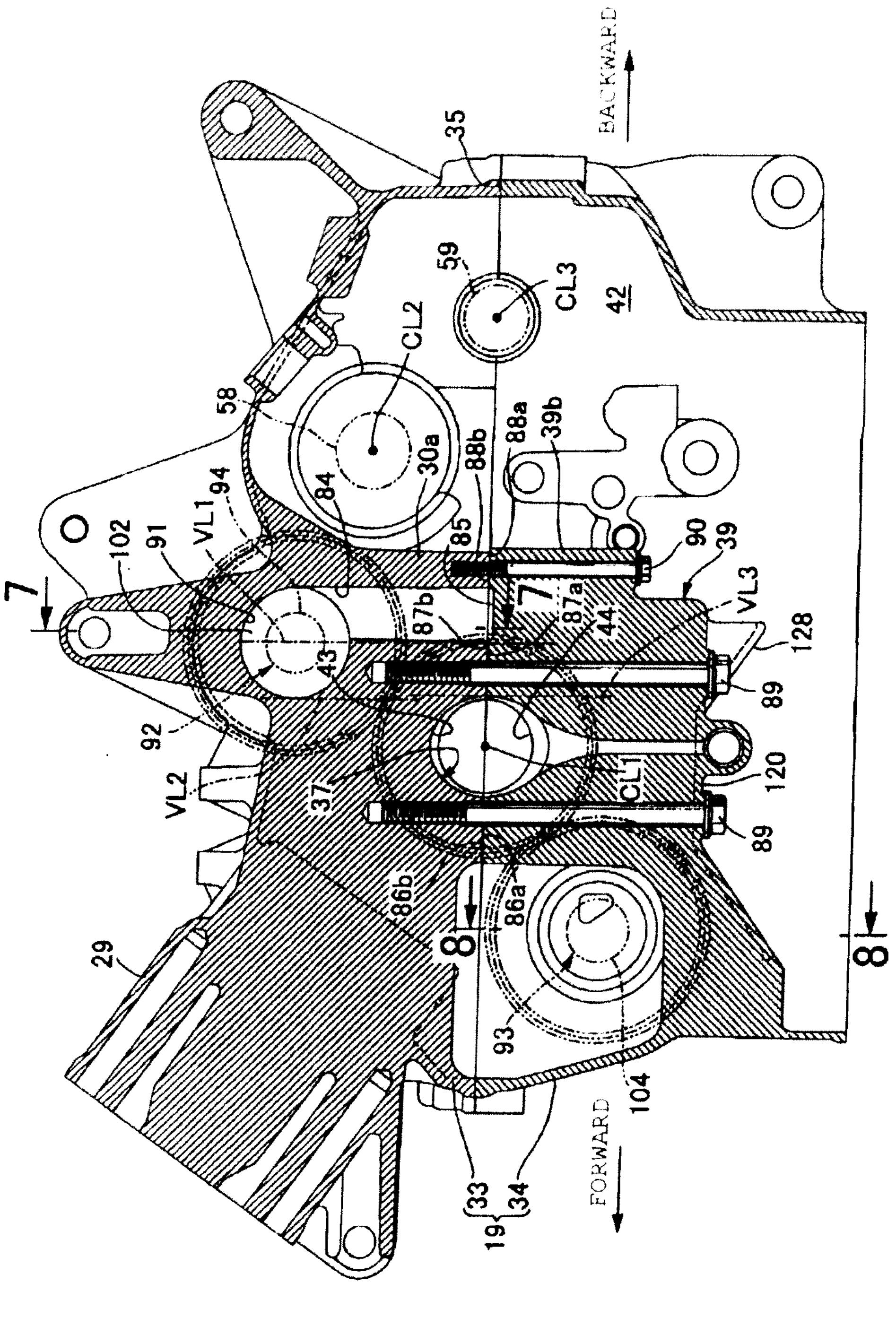
FIG. 6 is a sectional view of a cylinder block and a crankcase taken along line 6-6 of FIG. 4.

Referring to FIGS. 3, 5 and 6, a cutout 84 is provided in at least one of the upper wall portion 39*a* and the lower wall portion 39*b* of a particular support wall on the opposite sides of which the crank chambers 41, 41 are disposed from among the first to third support walls 38, 39 and 40 provided on the crankcase 19, that is, of the second support wall 39. The cutout 84 extends in upward and downward directions with one end thereof opened to the parting face 35 between the upper case half 33 and the lower case half 34 such that it communicates the crank chambers 41, 41 on the opposite sides of the second support wall 39 with each other. In the present embodiment, the cutout 84 which is open at one end thereof to the parting face 35 of the upper case half 33 to the lower case half 34 is provided in the upper wall portion 39*a* of the second support wall 39 in such a manner that, when the engine E is mounted on the vehicle, it is disposed rearwardly with respect to the crankshaft 28. Further, a recessed portion 85 recessed in a corresponding relationship to the cutout 84 is provided at an upper end of the lower wall portion 39*b* of the second support wall 39.

Incidentally, the axial line CL1 of the crankshaft 28 and the axial line CL3 of the countershaft 59 are disposed on the parting face 35 between the upper case half 33 and the lower case half 34 of the crankcase 19, and the main shaft 58 is disposed upwardly with respect to the parting face 35. The cutout 84 which is disposed forwardly with respect to the axial line CL2 of the main shaft 58 when the engine E is mounted on the vehicle is formed continuously from the parting face 35 to a position higher than the axial line CL2 of the main shaft 58 as shown in FIG. 6.

The cutout 84 is formed so as to extend in the upward and downward direction perpendicularly to the parting face 35, and the upper wall portion 39*a* and the lower wall portion 39*b* which configure the second support wall 39 are fastened at positions on the opposite sides of the cutout 84. In particular, on the upper wall portion 39*a* and the lower wall portion 39*b* of the second support wall 39, first attaching portions 86*a* and 86*b*, second attaching portions 87*a* and 87*b* and third attaching portions 88*a* and 88*b* are formed so as to be positioned on the parting face 35. The first attaching portions 86*a* and 86*b* are positioned forwardly of the crankshaft 28 when the engine E is mounted on the vehicle, and the second attaching portions 87*a* and 87*b* cooperate with the first attaching portions 86*a* and 86*b* to sandwich the crankshaft 28 therebetween. The third attaching portions 88*a* and 88*b* cooperate with the second attaching portions 87*a* and 87*b* to sandwich the cutout 84 therebetween. The upper wall portion 39*a* and the lower wall portion 39*b* are fastened to each other at the first and second attaching portions 86*a*, 86*b* and 87*a*, 87*b* thereof by bolts 89, 89 and fastened to each other at the third attaching portions 88*a* and 88*b* thereof by a bolt 90.

Further, a shaft hole 91 connecting to the other end of the cutout 84 is provided in the upper wall portion 39*a* of the second support wall 39. In a side elevation in a state in which the engine E is mounted on the vehicle with the axial line of the crankshaft 28 directed in the vehicle widthwise direction, a first virtual vertical line VL1 which passes the center of the shaft hole 91 is positioned forwardly with respect to the cutout 84 while a second virtual vertical line VL2 which passes the front end of the shaft hole 91 substantially overlaps with a third virtual vertical line VL3 which passes the rear end of the bearing hole 37. Further, the bearing hole 37, shaft hole 91 and cutout 84 are formed such that the second attaching portions 87*a* and 87*b* are disposed below the shaft hole 91.

On the crankcase 19, first and second balancers 92 and 93 which are primary balancers are supported for rotation. The first balancer 92 is disposed obliquely rearwardly upwards of the crankshaft 28 while the second balancer 93 is disposed obliquely forward downward of the crankshaft 28.

Figure 7:
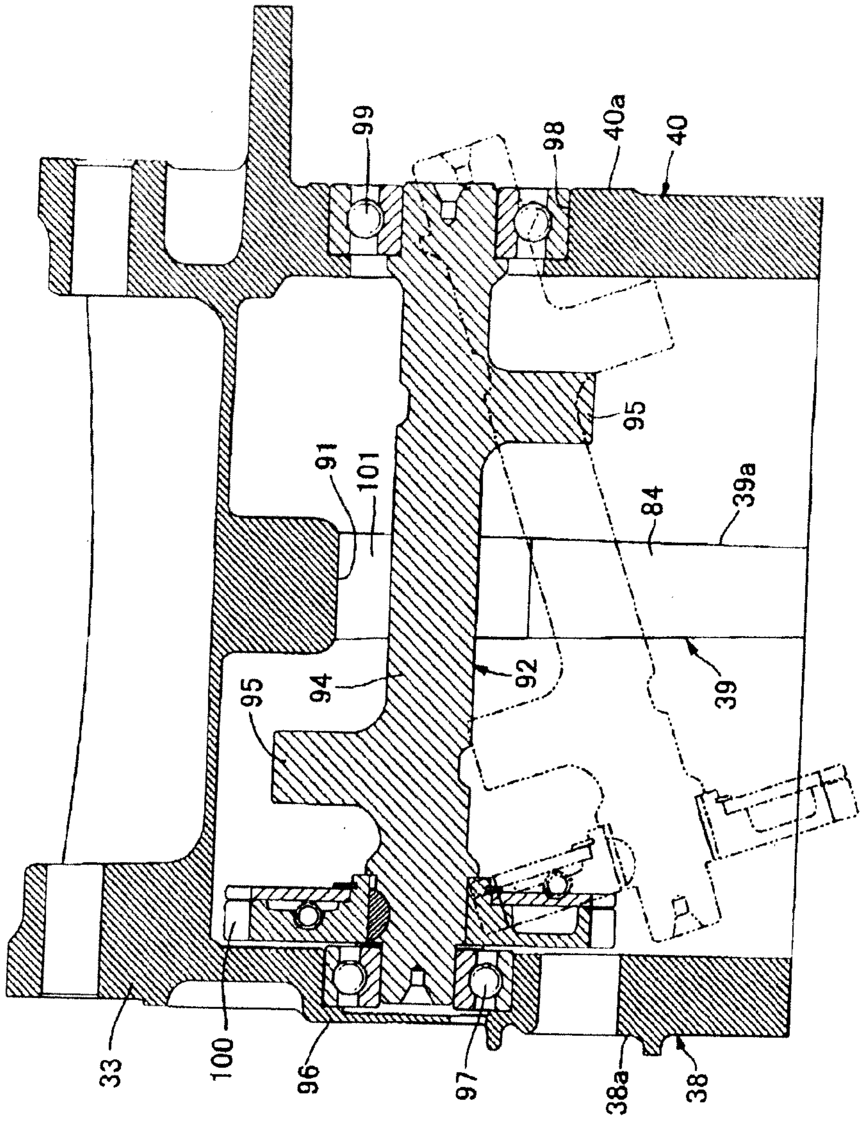
FIG. 7 is a sectional view of an upper case half and a first balancer taken along line 7-7 of FIG. 6.

Referring to FIG. 7, the first balancer 92 can include a first balancer shaft 94, and a pair of first balancer weights 95, 95 provided integrally with the first balancer shaft 94 at positions individually corresponding to the crank chambers 41 paired with each other. The first balancer shaft 94 can be supported at one end portion thereof for rotation on the crankcase 19 through a ball bearing 97 which is mounted on a bearing housing 96 provided on the upper wall portion 38*a* of the first support wall 38 of the crankcase 19. The first balancer shaft 94 is inserted at the other end portion thereof in a support hole 98 provided in the upper wall portion 40*a* of the third support wall 40 of the crankcase 19, and a ball bearing 99 is interposed between an inner circumference of the support hole 98 and an outer circumference of the first balancer shaft 94.

A first driven gear 100 of a scissors structure is provided on the first balancer shaft 94 in an adjacent and opposing relationship to the upper wall portion 38*a* of the first support wall 38 from the inner side. This first driven gear 100 meshes with a driving gear 101 (refer to FIG. 3) provided on the crankshaft 28.

Besides, the first balancer shaft 94 of the first balancer 92 is fitted in the shaft hole 91 provided in the upper wall portion 39*a* of the second support wall 39, and an annular gap 102 which communicates the crank chambers 41 of the second support wall 39 with each other is formed between the inner circumference of the shaft hole 91 and the outer circumference of the first balancer shaft 94. The shaft hole 91 serves also as a breathing hole for communicating the crank chambers 41 with each other.

Incidentally, the shaft hole 91 in which the first balancer shaft 94 is fitted is provided in the upper wall portion 39*a* of the second support wall 39 such that it connects to the other end, that is, the upper end, of the cutout 84. The first balancer 92 in a state in which the first driven gear 100 is provided is assembled to the upper case half 33 from the inner side, that is, from the lower side, in such a manner that the other end of the first balancer shaft 94 is inclined so as to be inserted into the support hole 98 of the upper wall portion 40*a* of the third support wall 40 first and then the first balancer shaft 94 is fitted into the shaft hole 91 through the cutout 84, as shown by a chained line in FIG. 7.

Figure 8:
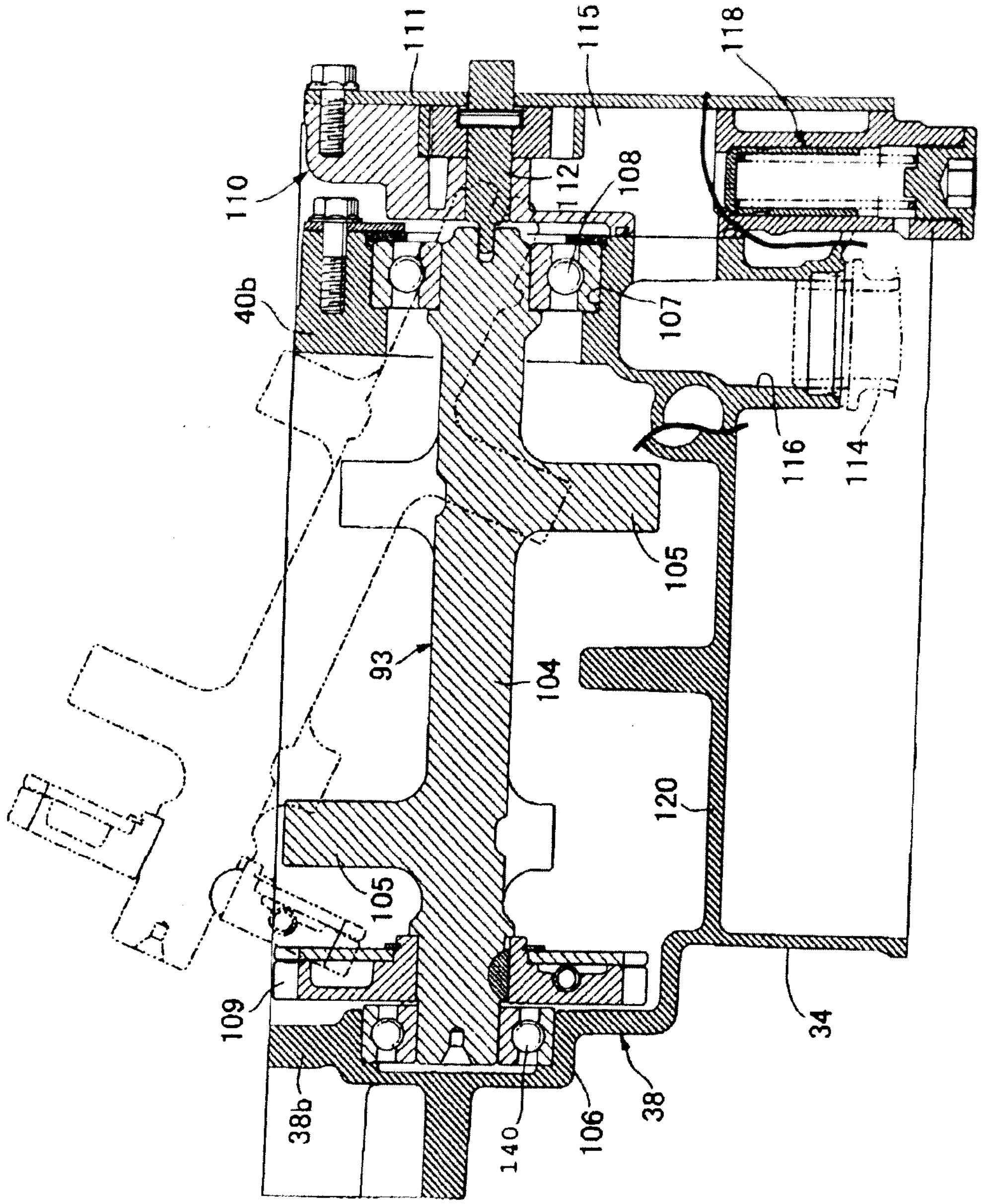
FIG. 8 is a sectional view of a lower case half and a second balancer taken along line 8-8 of FIG. 6.

Referring to FIG. 8, the second balancer 93 includes a second balancer shaft 104, and a pair of second balancer weights 105, 105 provided integrally with the second balancer shaft 104 at positions individually corresponding to the first balancer weights 95, 95 in a direction along the axial line of the crankshaft 28. The second balancer shaft 104 is supported at one end portion thereof for rotation on the crankcase 19 through a ball bearing 140 mounted on a bearing housing 106 provided on the lower wall portion 38*b* of the first support wall 38 of the crankcase 19. The second balancer shaft 104 is inserted at the other end portion thereof in a support hole 107 provided in the lower wall portion 40*b* of the third support wall 40 of the crankcase 19, and a ball bearing 108 is interposed between an inner circumference of the support hole 107 and an outer circumference of the second balancer shaft 104.

A second driven gear 109 of a scissors structure is provided on the second balancer shaft 104 in an adjacent opposing relationship to the lower wall portion 38*b* of the first support wall 38 from the inner side. The second driven gear 109 meshes with the driving gear 101 provided on the crankshaft 28.

The second balancer 93 in a state in which the second driven gear 109 is provided thereon is assembled to the lower case half 34 from the inner side, that is, from the upper side while the other end of the second balancer shaft 104 is inclined so as to be inserted into the ball bearing 107 of the lower wall portion 40*b* of the third support wall 40 first, as shown by a chained line in FIG. 8.

Incidentally, a pump case 111 of an oil pump 110 is attached to an outer face of the lower wall portion 40*b* of the third support wall 40 of the crankcase 19. A pump shaft 112 of the oil pump 110 is connected coaxially against relative rotation to the other end of the second balancer shaft 104.

In the oil pan 32 coupled to a lower portion of the crankcase 19, an oil strainer 113 is provided for purifying oil reserved in the oil pan 32 and for sucking up the oil by the oil pump 110 as seen in FIG. 2. An intake pipe 114 erected upwardly from the oil strainer 113 is connected at an upper end thereof to an intake path 116 provided in the lower case half 34 of the crankcase 19. This intake path 116 is communicated with an intake port 115 formed in the pump case 111.

A relief valve 118 connected to a discharge port (not shown) formed in the pump case 111 is disposed in the pump case 111. When the discharging pressure of the oil pump 110 becomes higher than a predetermined pressure, the relief valve 118 opens so that oil is partly returned from the discharge port into the oil pan 32 through the relief valve 118.

Figure 9:
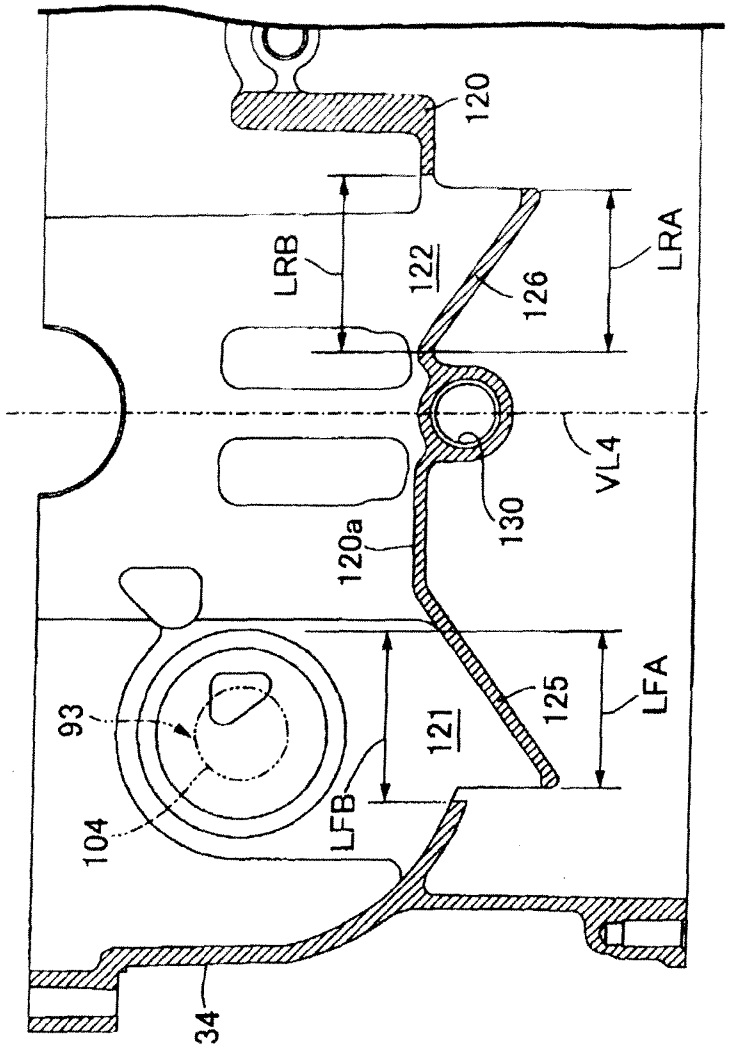
FIG. 9 is a sectional view taken along line 9-9 of FIG. 5.

Referring to FIGS. 5 and 9, a partition wall 120 which partitions the crank chambers 41 in the crankcase 19 and the inside of the oil pan 32 from each other is provided on the lower case half 34 of the crankcase 19. In this partition wall 120, openings 121, 122 and 123, 124 are provided for returning oil from the crank chambers 41 side to the oil pan 32 side.

In the partition wall 120, the plural sets of openings paired in the forward and backward direction in a state in which the engine E is mounted on the vehicle are provided in a spaced relationship from each other in the vehicle widthwise direction. In the present embodiment, the two sets of openings 121, 122 and 123, 124 including the openings 121 and 122 disposed between the first and second support walls 38 and 39 and paired forwardly and backwardly with each other, and the openings 123 and 124 disposed between the second and third support walls 39 and 40 and paired forwardly and backwardly with each other, are provided in the partition wall 120.

Bridges 125, 126 and 127, 128 for suppressing backflow of the oil from the oil pan 32 side to the crank chambers 41 side are disposed fixedly below the openings 121, 122 and 123, 124 in such a manner as to cover at least part of the openings 121, 122 and 123, 124 from below, respectively. The bridges 125, 126 and 127, 128 are provided integrally with the partition wall 120.

At least part of the partition wall 120 can be formed flat as a horizontal wall portion 120*a*. In the present embodiment, the openings 121, 122 and 123, 124 paired forwardly and backwardly with each other is formed as the horizontal wall portion 120*a* as the part of the partition wall 120, and the bridges 125, 126 and 127, 128 extend outwardly from the horizontal wall portion 120*a* in such a manner as to be inclined downwardly from the horizontal wall portion 120*a*.

The bridges 125, 126 and 127, 128 are formed such that they project outwardly in at least one of the forward and backward directions from the horizontal wall portion 120*a* when the engine E is mounted on the vehicle. In the present embodiment, the bridges 125 and 127 which cover the openings 121 and 123 on the front side from among the openings 121, 122 and 123, 124 paired forwardly and backwardly with each other from below are formed such that they extend obliquely forwardly downwards from the rear edge of the openings 121 and 123. The bridges 126 and 128 which cover the openings 122 and 124 on the rear side from among the openings 121, 122 and 123, 124 paired forwardly and backwardly with each other from below are formed such that they extend obliquely rearwardly downwards from the front edge of the openings 122 and 124. The lengths LFA and LRA in the forward and backward direction of the bridges 125, 127 and 126, 128 when the engine E is mounted on the vehicle are set to be longer than the lengths LFB and LRB in the forward and backward direction of the openings 121, 123 and 122, 124.

The crankshaft 28, whose axial line extends along the vehicle widthwise direction in the state in which the engine E is mounted on the vehicle, is supported for rotation on the crankcase 19 above the partition wall 120. The bridges 125, 127 and 126, 128 are disposed at least on one of the front and rear sides of a fourth virtual vertical line VL4 which passes the axial line of the crankshaft 28. In the present embodiment, the bridges 125, 127 and 126, 128 are disposed on both of the front and rear sides of the fourth virtual vertical line VL4.

Meanwhile, while the second balancer 93 is disposed obliquely forwardly downwards of the crankshaft 28, the openings 121 and 123 on the front side from among the openings 121, 122 and 123, 124 paired forwardly and backwardly with each other are disposed below the second balancer 93.

Further, a main gallery 130 which is an oil path disposed between the openings 121 and 123 on the front side and the openings 122 and 124 on the rear side from among the two sets of openings 121, 122 and 123, 124 and extending in the vehicle widthwise direction is provided in the partition wall 120. Oil discharged from the oil pump 110 is introduced into the main gallery 130 through an oil filter 131 (refer to FIG. 2) attached to a front face of a lower portion of the crankcase 19.

The pair of bolts 89, 89 for fastening the upper wall portion 39*a* and the lower wall portion 39*b* which configure the second support wall 39 to each other are disposed in such a manner as to sandwich the main gallery 130, forwardly and rearwardly, between the openings 121 and 122 disposed leftwardly and the openings 123 and 124 disposed rightwardly when the engine is mounted on the vehicle. The upper case half 33 and the lower case half 34 cooperate with each other to configure the crankcase 19 and are coupled to each other by a plurality of bolts including the bolts 89, 89, disposed at least at two places in such a manner as to sandwich the main gallery 130 forwardly and backwardly between the plural openings 121, 122 and 123, 124, juxtaposed with each other in the vehicle widthwise direction.

Operation of the present working example 1 will be described. The crankcase 19, on which the first, second and third support walls 38, 39 and 40 having the bearing holes 37 in and by which the crankshaft 28 is fitted and supported for rotation are provided, is configured as follows:

The upper case half 33, on which the plural upper wall portions 38*a*, 39*a* and 40*a*, corresponding to the first to third support walls 38 to 40 are provided, and the lower case half 34 on which the lower wall portions 38*b*, 39*b* and 40*b* which cooperate with the upper wall portions 38*a*, 39*a* and 40*a* to configure the first to third support walls 38 to 40, can be divided upwardly and downwardly from each other. On at least one of the upper wall portion 39*a* and the lower wall portion 39*b* which configure the second support wall 39 which is a particular support wall on the opposite sides of which the crank chambers 41 are disposed from among the first to third support walls 38 to 40, the cutout 84 is provided. Cutout 84 is open at one end thereof to the parting face 35 between the upper case half 33 and the lower case half 34, and extends in the upward and downward direction, in such a manner as to communicate the crank chambers 41 on the opposite sides of the second support wall 39 with each other. Therefore, the crank chambers 41 disposed adjacent each other can be communicated with each other using the cutout 84 which can be molded by a metal mold without using a core. Consequently, a machining step is reduced or made unnecessary so that increase of the number of working steps can be prevented and the productivity can be raised while a structure for communicating the adjacent crank chambers 41 with each other can be implemented.

Further, since the cutout 84 is provided on the upper wall portion 39*a* which configures part of the second support wall 39, the rigidity of the second support wall 39 can be assured in comparison with an alternative case in which the cutout 84 is provided on the lower case half 34.

Further, since the cutout 84 is disposed rearwardly with respect to the crankshaft 28 which has an axial line along the vehicle widthwise direction when the engine E is mounted on the vehicle, the rigidity between the crankshaft 28 and the cylinder bores 36 is assured with certainty while a breathing function by the cutout 84 can be assured in comparison with an alternative case wherein the cutout 84 exists forwardly with respect to the crankshaft 28 for which comparatively high rigidity is required.

Incidentally, the first and second balancers 92 and 93 are supported for rotation on the crankcase 19, and the shaft hole 91 connecting to the other end of the cutout 84 is provided in the upper wall portion 39*a* of the second support wall 39 such that it allows the first balancer shaft 94 of the first balancer 92 to be fitted therein and serves also as a breathing hole. Therefore, in comparison with an alternative case in which the shaft hole 91 and a breathing hole are provided separately from the cutout 84, it becomes possible to form the shaft hole 91 making use of part of the cutout 84 formed by casting and hole formation carried out by machining can be facilitated to achieve reduction of the man-hours for manufacture.

The first balancer 92 is formed from the first balancer shaft 94 and the first balancer weights 95, 95 in pair provided on the first balancer shaft 94 and is assembled to the upper case half 33 in such a manner that the first balancer shaft 94 is fitted into the shaft hole 91 through the cutout 84. Consequently, the first balancer 92 can be assembled from the inner side of the first balancer 92, and the assembly performance of the first balancer 92 is improved.

The main shaft 58 to which power from the crankshaft 28 is transmitted, and the countershaft 59 which cooperates with the main shaft 58 such that the first to sixth speed gear trains G1 to G6 which can be selectively established are provided therebetween are supported for rotation on the crankcase 19 such that they have axial lines parallel to the crankshaft 28, and the axial line CL1 of the crankshaft 28 and the axial line CL3 of the countershaft 59 are disposed on the parting face 35 between the upper case half 33 and the lower case half 34. The cutout 84 disposed forwardly with respect to the axial line CL2 of the main shaft 58 which is disposed upwardly with respect to the parting face 35 when the engine E is mounted on the vehicle is formed continuously from the parting face 35 to a position higher than the axial line CL2 of the main shaft 58. Therefore, the transverse area of the cutout 84 can be increased thereby to raise the breathing effect by the cutout 84.

Cutout 84 is formed such that it extends in the upward and downward direction perpendicularly to the parting face 35. The upper wall portion 39*a* and the lower wall portion 39*b* which configure the second support wall 39 are fastened to each other at positions at which they sandwich the cutout 84 therebetween. Therefore, in comparison with an alternative configuration wherein the cutout 84 is formed in such a manner as to extend obliquely with respect to the parting face 35, it is possible to increase the area of the attaching portions of the upper wall portion 39*a* and the lower wall portion 39*b* while preventing interference with the cutout 84. This can enhance the coupling rigidity of the upper wall portion 39*a* and the lower wall portion 39*b*.

The first attaching portions 86*a* and 86*b* positioned forwardly with respect to the crankshaft 28 when the engine E is mounted on the vehicle, the second attaching portions 87*a* and 87*b* cooperating with the first attaching portions 86*a* and 86*b* to sandwich the crankshaft 28 therebetween, and the third attaching portions 88*a* and 88*b* cooperating with the second attaching portions 87*a* and 87*b* to sandwich the cutout 84 therebetween are formed on the upper wall portion 39*a* and the lower wall portion 39*b* which configure the second support wall 39, respectively. Further, the first to third attaching portions 86*a* and 86*b*, 87*a* and 87*b*, and 88*a* and 88*b* of the upper wall portion 39*a* and the lower wall portion 39*b* are fastened to each other. Therefore, the upper wall portion 39*a* and the lower wall portion 39*b* which configure the second support wall 39 can be coupled firmly to each other, while the bearing hole 37, in and by which the crankshaft 28 is fitted and supported, is formed.

As viewed in side elevation in the state in which the engine E is mounted on the vehicle and the axial line of the crankshaft 28 extends along the vehicle widthwise direction, the first virtual vertical line VL1 which passes the center of the shaft hole 91 is positioned forwardly with respect to the cutout 84 and the second virtual vertical line VL2 which passes the front end of the shaft hole 91 substantially overlaps with the third virtual vertical line VL3 which passes the rear end of the bearing hole 37. Further, the bearing hole 37, shaft hole 91 and cutout 84 are formed such that the second attaching portions 87*a* and 87*b* are disposed below the shaft hole 91. Therefore, it is possible to reduce the distance between the bearing hole 37 and the cutout 84 thereby to achieve miniaturization of the crankcase 19 and to form the second attaching portions 87*a* and 87*b* utilizing a dead space.

The oil pan 32 in this example can be coupled to a lower portion of the crankcase 19, and the partition wall 120 which partitions the crank chambers 41 in the crankcase 19 and the inside of the oil pan 32 from each other, can be provided on the crankcase 19 above the oil pan 32. The openings 121 to 124 for returning oil from the crank chambers 41 side to the oil pan 32 side are provided in the partition wall 120, and the bridges 125 to 128 for suppressing backflow of oil from the oil pan 32 side to the crank chambers 41 side are fixedly disposed below the openings 121 to 124 in such a manner as to cover at least part of the openings 121 to 124 from below.

Accordingly, the oil can be returned smoothly from within the crankcase 19 into the oil pan 32, and also where the oil surface in the oil pan 32 oscillates by swinging movement of the engine E, the bridges 125 to 128 can suppress the oil from flowing back from the oil pan 32 side to the crank chambers 41 side by jumping of the oil from the oil pan 32. Consequently, deterioration of the recovering property by aeration or oil dispersion can be reduced or prevented.

Further, since the bridges 125 to 128 are provided integrally with the partition wall 120, in comparison with an alternative case wherein the bridges 125 to 128 are formed separately from the partition wall 120, reduction of the number of parts can be achieved, and the necessity for the attaching work of the bridges 125 to 128 can be eliminated thereby to achieve reduction of the man-hours for manufacturing.

Further, at least part of the partition wall 120 is formed flat as the horizontal wall portion 120*a*, and the bridges 125 to 128 extend from the horizontal wall portion 120*a* such that it is inclined downwardly from the horizontal wall portion 120*a*. Therefore, the oil can be returned smoothly from the crank chambers 41 into the inside of the oil pan 32, and jumping or splashing of the oil from the oil pan 32 can be suppressed by the inclined bridges 125 to 128.

Further, the bridges 125 to 128 can be formed such that they extend at least in one of the forward and backward directions from the horizontal wall portion 120*a* when the engine E is mounted on the vehicle. Consequently, the bridges 125 to 128 can be disposed so as to cope with oscillation of the oil-surface in the oil pan 32 in the forward and backward directions upon starting, stopping, and other operations of the vehicle.

Since the lengths LFA and LRA in the forward and backward direction of the bridges 125, 127 and 126, 128, when the engine E is mounted on the vehicle, are set smaller than the lengths LFB and LRB in the forward and backward direction of the openings 121, 123 and 122, 124, it is possible to prevent the length of the bridges 125 to 128 in the forward and backward direction from becoming longer than necessary by the inclination of the bridges 125 to 128.

The openings 121, 122 and 123, 124 are provided in the partition wall 120 in such a manner that they are paired with each other in the forward and backward direction in the state in which the engine E is mounted on the vehicle, and the bridges 125 and 127 corresponding to the forward openings 121 and 123 extend forwardly from the partition wall 120 while the bridges 126 and 128 corresponding to the rearward openings 122 and 124 extend rearwardly from the partition wall 120. Therefore, the oil recovering property into the oil pan 32 is enhanced by the plural openings 121, 122 and 123, 124. As a result, forward and backward oscillation of the oil surface in the oil pan 32 can be suppressed by the front and rear inclined bridges 125 to 128.

Further, the crankshaft 28 whose axial line extends along the vehicle widthwise direction in the state in which the engine E is mounted on the vehicle is supported for rotation on the crankcase 19 above the partition wall 120, and the openings 121, 122 and 123, 124 and the bridges 125, 127 and 126, 128 are disposed at least on one of the front and rear sides (in the present embodiment, on both of the front and rear sides) of the fourth virtual vertical line VL4 which passes the axial line of the crankshaft 28. Therefore, the oil scattered or splashed from the crankshaft 28 can be recovered smoothly into the oil pan 32.

Further, the second balancer 93 disposed obliquely forwardly downwards of the crankshaft 28 is supported for rotation by the crankcase 19 and the openings 121 and 123 disposed below the second balancer 93 is provided in the partition wall 120 while the bridges 125 and 127 are disposed below the openings 121 and 123. Therefore, the oil scattered from the second balancer 93 can be recovered smoothly into the oil pan 32.

The plural sets of openings 121, 122 and 123, 124 which are paired with each other in the forward and backward direction in the state in which the engine E is mounted on the vehicle are provided in a spaced relationship from each other in the vehicle widthwise direction in the partition wall 120. The main gallery 130, disposed between the openings 121 and 123 on the front side and the openings 122 and 124 on the rear side and extending in the vehicle widthwise direction is provided on the partition wall 120. The upper case half 33 and the lower case half 34 which cooperatively configure the crankcase 19 and are coupled for upward and downward separation to each other are coupled to each other by means of a plurality of bolts including the bolts 89, 89. The bolts can be disposed at least at two places between which the main gallery 130 is sandwiched from forwardly and backwardly between the plural openings juxtaposed in the vehicle widthwise direction; that is, between the openings 121 and 122 disposed leftwardly and the openings 123 and 124 disposed rightwardly. Therefore, the main gallery 130 can be disposed in a high space efficiency in the dead space while preventing interference with the plural openings 121 to 124 provided in the partition wall 120 and the bolts 89, 89, 90 for coupling the upper case half 33 and the lower case half 34 to each other. Consequently, design efficiency can be realized, and an increase in size of the crankcase 19 can be prevented.

Figure 10:
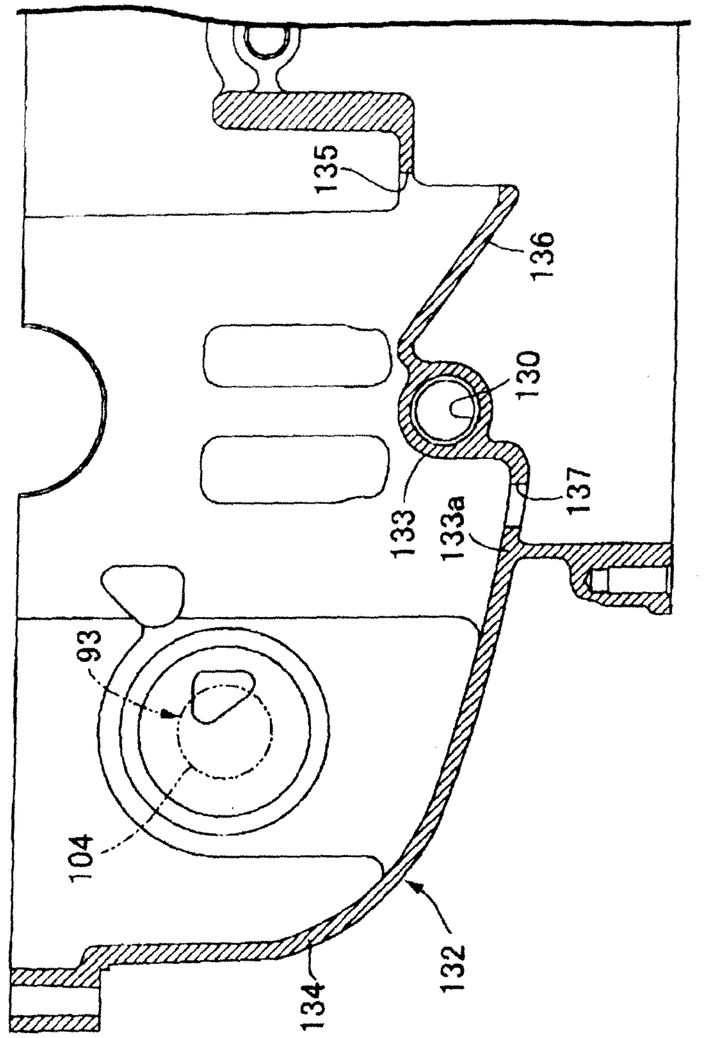
FIG. 10 is a sectional view corresponding to FIG. 9 showing part of a crankcase of a working example 2.

A second working example 2 of the present invention is described with reference to FIG. 10. However, portions corresponding to those of the first working example 1 are denoted by like reference symbols applied thereto while detailed description of them is omitted.

On a lower case half 134 which configures part of a crankcase 132, a partition wall 133 can be provided which partitions a crank chamber in the crankcase 132 and the inside of an oil pan coupled to a lower portion of the crankcase 132. An opening 135 for returning oil from the crank chamber side to the oil pan side is provided in the partition wall 133.

A bridge 136 for suppressing backflow of the oil from the oil pan side to the crank chamber side is fixedly disposed below the opening 135 in such a manner as to cover at least part of the opening 135 from below. The bridge 136 can be provided integrally with the partition wall 133.

The bridge 136 connects integrally to the partition wall 133 such that it extends rearwardly downward from the partition wall 133 in the state in which the engine E is mounted on the vehicle. An inclined wall portion 133*a* inclined rearwardly downwards forwardly of the bridge 136 is provided at part of the partition wall 133, and an oil returning hole 137 of a small diameter for returning the oil from the crank chamber side to the oil pan side is provided at a lowermost portion of a rear end of the inclined wall portion 133*a*. A main gallery 130 extending in the vehicle widthwise direction is provided on the partition wall 133 between the opening 135 and the oil returning hole 137.

With the working example 2, returning of the oil to the crank chamber side by forward oscillation of the oil surface in the oil pan is stopped by the inclined wall portion 133*a*, and returning of the oil to the crank chamber side by rearward oscillation of the oil surface is stopped by the rearwardly inclined bridge 136. Consequently, backflow of the oil by jumping or splashing from the oil pan can be suppressed efficiently, and returning of the oil from the crank chamber to the oil pan is assured by the opening 135 while the oil which is guided by the upper face of the inclined wall portion 133*a* is dropped from the oil returning hole 137 into the oil pan thereby to assure a sufficient recovering property. Further, by forming the oil returning hole 137 with a small diameter, also it is possible to suppress the oil from returning from the oil pan to the crank chamber side through the oil returning hole 137.

While the embodiments of the present invention have been described above, the present invention is not limited to the embodiments described above but allows various design variations without departing from the present invention described in the claims.

DESCRIPTION OF THE REFERENCE SYMBOLS

19, 132 . . . Crankcase
28 . . . Crankshaft
32 . . . Oil pan
33 . . . Upper case half
34 . . . Lower case half
41 . . . Crank chamber
93 . . . Second balancer which is a balancer
120, 133 . . . Partition wall
120*a* . . . Horizontal wall portion
121, 122, 123, 124, 135 . . . Opening
125, 126, 127, 128, 136 . . . Bridge
133*a* . . . . Inclined wall portion
137 . . . . Oil returning hole

We claim:

1. An engine for a vehicle, said engine comprising: an oil pan coupled to a lower portion of a crankcase;

a partition wall configured to partition a crank chamber in said crankcase and the inside of said oil pan, said partition wall disposed on said crankcase, and said partition wall comprising openings configured to return oil from a crank chamber side to an oil pan side; and bridges configured to suppress backflow of the oil from the oil pan side to said crank chamber side, said bridges being fixedly disposed below said openings so as to cover at least part of said openings from below, wherein said bridges are disposed integrally with said partition wall, wherein a bridge extending rearwardly from said partition wall in a state in which the engine is mounted on the vehicle is disposed below an opening so as to cover at least part of the opening, and an inclined wall portion extends rearwardly downwards of said bridge is provided at part of the partition wall while an oil returning hole configured to retain the oil from the crank chamber side to the oil pan side is provided at a lowermost portion of a rear end of said inclined wall portion.

2. The engine according to claim 1, wherein at least part of said partition wall is formed flat as a horizontal wall portion, said bridges extending from said horizontal wall portion so as to be inclined downwardly therefrom.

3. The engine according to claim 2, wherein said bridges are disposed in such a manner as to project in at least one of forward and backward directions from said horizontal wall portion when the engine is mounted on the vehicle.

4. The engine according to claim 2, wherein a length of said bridges in the forward and backward direction when said engine is mounted on the vehicle is set to be smaller than a length of said openings in the forward and backward direction.

5. The engine according to claim 1, wherein said openings are provided in said partition wall so as to be paired in the forward and backward direction in a state in which the engine is mounted on the vehicle, and wherein the bridges corresponding to the front side openings extend forwardly from said partition wall while the bridges corresponding to the rear side openings extend rearwardly from said partition wall.

6. The engine according to claim 1, further comprising, a crankshaft disposed in the crankcase, said crankshaft having an axial line extending along a vehicle widthwise direction in a state in which said engine is mounted on the vehicle is supported for rotation on said crankcase above said partition wall, and wherein said bridges are disposed at least on one of the front and rear sides of a virtual vertical line which passes the axial line of said crankshaft.

7. The engine according to claim 6, further comprising a balancer disposed obliquely forwardly downward of said crankshaft, said balancer being supported for rotation by said crankcase, wherein the openings disposed below said balancer are provided in said partition wall while the bridges are disposed below said openings.

8. An engine for a vehicle, said engine comprising: an oil pan coupled to a lower portion of a crankcase; a partition wall configured to partition a crank chamber in said crankcase and the inside of said oil pan, said partition wall disposed on said crankcase, and said partition wall comprising openings configured to return oil from a crank chamber side to an oil pan side; and bridges configured to suppress backflow of the oil from the oil pan side to said crank chamber side, said bridges being fixedly disposed below said openings so as to cover at least part of said openings from below, wherein the crankcase includes an upper case half and a lower case half coupled to each other for upward and downward division, wherein the openings paired in the forward and backward direction in a state in which said engine is mounted on the vehicle are provided in a spaced relationship from each other in a vehicle widthwise direction in said partition wall, wherein an oil path disposed between the openings on the front side and the openings on the rear side and extending in the vehicle widthwise direction is provided in said partition wall, and wherein said upper case half and said lower case half are coupled to each other by a plurality of bolts including bolts disposed at least at two locations between which said oil path is sandwiched from the front side and the rear side between the plural openings juxtaposed in the vehicle widthwise direction, wherein a bridge extending rearwardly from said partition wall in a state in which the engine is mounted on the vehicle is disposed below the opening so as to cover at least part of the opening, and an inclined wall portion inclined rearwardly downwards of said bridge is provided at part of the partition wall while an oil returning hole configured to retain the oil from the crank chamber side to the oil pan side is provided at a lowermost portion of a rear end of said inclined wall portion.

9. An engine for a vehicle, said engine comprising: supporting means for supporting engine components therein;

containing means coupled to a lower portion of said supporting means, said containing means for containing lubricating oil therein;

partitioning means for partitioning a crank chamber in said supporting means and said containing means, said partitioning means being disposed on said supporting means and including openings for returning oil from a crank chamber side to a containing means side;

and suppressing means for suppressing backflow of the lubricating oil from the containing means side to the crank chamber side, said suppressing means being fixedly disposed said openings so as to cover at least part of said openings from below, wherein said suppressing means are disposed integrally with said partitioning means, wherein a bridge element of the suppressing means extending rearwardly from said partitioning means in a state in which the engine is mounted on the vehicle is disposed below the opening so as to cover at least part of the opening, and an inclined wall portion extending rearwardly downwards of the bridge element is provided at part of the partitioning means while an oil returning hole for returning the oil from the crank chamber side to the oil pan side is provided at a lowermost portion of a rear end of the inclined wall portion.

10. The engine according to claim 9, wherein at least part of said partitioning means is formed flat as a horizontal wall portion, said suppressing means extending from said horizontal wall portion so as to be inclined downwardly therefrom.

11. The engine according to claim 10, wherein said suppressing means are disposed in such a manner so as to project in at least one of forward and backward directions from said horizontal wall portion when the engine is mounted on the vehicle.

12. The engine according to claim 10, wherein a length of the suppressing means in the forward and backward direction when the engine is mounted on the vehicle is set to be smaller than a length of the openings in the forward and backward direction.

13. The engine according to claim 9, wherein said openings are provided in said partitioning means so as to be paired in the forward and backward direction in a state which the engine is mounted on a vehicle, wherein the suppressing means corresponding to the front side openings extend forwardly from said partitioning means while the suppressing means corresponding to the rear side openings extend rearwardly from said partitioning means.

14. The engine according to claim 9, further comprising rotating means disposed in said supporting means, said rotating means having an axial line extending along a vehicle widthwise direction in a state in which the engine is mounted on the vehicle is supported for rotation on the supporting means above the partitioning means, and wherein the suppressing means are disposed at least one of the front and rear sides of a virtual vertical line which passes the axial line of said rotating means.

15. The engine according to claim 14, further comprising balancing means disposed obliquely forwardly downward of said rotating means, said balancing means being supported for rotation by said rotating means, wherein the openings disposed below said balancing means are provided in said partitioning means, while the suppressing means are disposed below the opening.

16. An engine for a vehicle, said engine comprising:

supporting means for supporting engine components therein;

containing means coupled to a lower portion of said supporting means, said containing means for containing lubricating oil therein;

partitioning means for partitioning a crank chamber in said supporting means and said containing means, said partitioning means being disposed on said supporting means and including openings for returning oil from a crank chamber side to a containing means side; and suppressing means for suppressing backflow of the lubricating oil from the containing means side to the crank chamber side, said suppressing means being fixedly disposed said openings so as to cover at least part of said openings from below, wherein the supporting means include an upper case half and a lower case half, coupled to each other for forward and downward division, wherein the openings paired in the forward and backward direction in a state in which the engine is mounted on the vehicle are provided in a spaced relationship from each other in a vehicle widthwise direction in the partitioning means, wherein an oil path disposed between the openings on the front side and openings on the rear side and extending in the vehicle widthwise direction is provided in the partitioning means, and wherein the upper case half and the lower case half are coupled to each other by a fastening means, said fastening means being disposed at least at two locations between which the oil path is sandwiched from a front side and a rear side between the plural openings, juxtaposed in the vehicle widthwise direction.

17. An engine for a vehicle, said engine comprising:

an oil pan coupled to a lower portion of a crankcase;

a partition wall configured to partition a crank chamber in said crankcase and the inside of said oil pan, said partition wall disposed on said crankcase, and said partition wall comprising openings configured to return oil from a crank chamber side to an oil pan side; and bridges configured to suppress backflow of the oil from the oil pan side to said crank chamber side, said bridges being fixedly disposed below said openings so as to cover at least part of said openings from below, wherein said bridges are disposed integrally with said partition wall, wherein at least part of said partition wall is formed flat as a horizontal wall portion, said bridges extending from said horizontal wall portion so as to be inclined downwardly therefrom.

18. An engine for a vehicle, said engine comprising:

an oil pan coupled to a lower portion of a crankcase;

a partition wall configured to partition a crank chamber in said crankcase and the inside of said oil pan, said partition wall disposed on said crankcase, and said partition wall comprising openings configured to return oil from a crank chamber side to an oil pan side; and bridges configured to suppress backflow of the oil from the oil pan side to said crank chamber side, said bridges being fixedly disposed below said openings so as to cover at least part of said openings from below, wherein said bridges are disposed integrally with said partition wall, wherein said openings are provided in said partition wall so as to be paired in the forward and backward direction in a state in which the engine is mounted on the vehicle, and wherein the bridges corresponding to the front side openings extend forwardly down from said partition wall while the bridges corresponding to the rear side openings extend rearwardly down from said partition wall.

19. An engine for a vehicle, said engine comprising:

supporting means for supporting engine components therein;

containing means coupled to a lower portion of said supporting means, said containing means for containing lubricating oil therein;

partitioning means for partitioning a crank chamber in said supporting means and said containing means, said partitioning means being disposed on said supporting means and including openings for returning oil from a crank chamber side to a containing means side; and suppressing means for suppressing backflow of the lubricating oil from the containing means side to the crank chamber side, said suppressing means being fixedly disposed said openings so as to cover at least part of said openings from below, wherein said suppressing means are disposed integrally with said partitioning means, wherein at least part of said partitioning means is formed flat as a horizontal wall portion, said suppressing means extending from said horizontal wall portion so as to be inclined downwardly therefrom.

20. An engine for a vehicle, said engine comprising:

supporting means for supporting engine components therein;

containing means coupled to a lower portion of said supporting means, said containing means for containing lubricating oil therein;

partitioning means for partitioning a crank chamber in said supporting means and said containing means, said partitioning means being disposed on said supporting means and including openings for returning oil from a crank chamber side to a containing means side; and suppressing means for suppressing backflow of the lubricating oil from the containing means side to the crank chamber side, said suppressing means being fixedly disposed below said openings so as to cover at least part of said openings from below, wherein said suppressing means are disposed integrally with said partitioning means, wherein said openings are provided in said partitioning means so as to be paired in the forward and backward direction in a state which the engine is mounted on the vehicle, wherein the suppressing means corresponding to the front side openings extend forwardly down from said partitioning means while the suppressing means corresponding to the rear side openings extend rearwardly down from said partitioning means.

* * * * *